United States Patent
Huang

(10) Patent No.: US 12,446,991 B2
(45) Date of Patent: Oct. 21, 2025

(54) SURGICAL TOOL AND IDENTIFICATION SYSTEM FOR DETERMINING USAGE STATUS OF THE SAME

(71) Applicant: Point Robotics Medtech Inc., Hsinchu County (TW)

(72) Inventor: Kun-Pin Huang, Hsinchu County (TW)

(73) Assignee: Point Robotics Medtech Inc., Hsinchu County (TW)

( * ) Notice: Subject to any disclaimer, the term of this patent is extended or adjusted under 35 U.S.C. 154(b) by 330 days.

(21) Appl. No.: 18/454,033

(22) Filed: Aug. 22, 2023

(65) Prior Publication Data

US 2024/0341915 A1    Oct. 17, 2024

(30) Foreign Application Priority Data

Apr. 13, 2023   (TW) .................................. 112113756

(51) Int. Cl.
   *A61B 90/90* (2016.01)
   *A61B 17/00* (2006.01)
   *A61B 90/00* (2016.01)

(52) U.S. Cl.
   CPC .............. *A61B 90/90* (2016.02); *A61B 90/37* (2016.02); *A61B 90/39* (2016.02); *A61B 2017/00486* (2013.01); *A61B 2090/0805* (2016.02)

(58) Field of Classification Search
   CPC .......... A61B 90/90; A61B 2017/00486; A61B 2017/0046; A61B 2090/3937
   See application file for complete search history.

(56) References Cited

U.S. PATENT DOCUMENTS

| 2016/0331479 | A1* | 11/2016 | Crawford | ............... A61B 90/96 |
| 2019/0029707 | A1* | 1/2019 | Asher | ............ A61B 17/320092 |

* cited by examiner

*Primary Examiner* — John R Downey
*Assistant Examiner* — Karmel J Webster
(74) *Attorney, Agent, or Firm* — Li & Cai Intellectual Property Office

(57) ABSTRACT

A surgical tool and an identification system for determining usage status of the same are provided. The surgical tool includes a rod surgical instrument, a shielding component and an adapter. The rod surgical instrument includes a rod having two ends being an operation end and a joint end, respectively, a first mark is arranged on the rod, the shielding component is movably sleeved on the rod, and the adapter is detachably combined with the rod surgical instrument. The shielding component located at a first position on the rod shields the first mark as the surgical tool is in an unused state. As the surgical tool is in a used state, and after the rod surgical instrument is separated from the adapter, the shielding component moves from the first position of the rod to a second position of the rod to expose at least part of the first mark.

20 Claims, 10 Drawing Sheets

SURGICAL TOOL AND IDENTIFICATION SYSTEM FOR DETERMINING USAGE STATUS OF THE SAME

CROSS-REFERENCE TO RELATED PATENT APPLICATION

This application claims the benefit of priority to Taiwan Patent Application No. 112113756, filed on Apr. 13, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a tool and an identification system thereof, and more particularly to a surgical tool and an identification system for determining usage status of the same.

BACKGROUND OF THE DISCLOSURE

In conventional technique, an existing surgical tool used for spinal surgery (e.g., Schanz pin) usually has a special structure on one end for being combined with a hand piece, in order to perform a surgical operation. As the surgery is done, the surgical tool is removed from the hand piece and disposed properly so as to avoid repeated use.

However, due to lack of a mechanism for identifying usage status of the surgical tool, after an operation is completed, medical personnel may accidentally put the used surgical tool with unused tools, which may result in repeated use of the used tool, thereby causing infection in the patient or increasing surgery-related risk.

Therefore, it is necessary to provide an effective identification mechanism for the existing surgical tools to reduce surgical risk.

SUMMARY OF THE DISCLOSURE

In response to the above-referenced technical inadequacies, the present disclosure provides a surgical tool and an identification system for determining usage status of the same.

In one aspect, the present disclosure provides a surgical tool, which includes a rod surgical instrument, a shielding component, and an adapter. The rod surgical instrument includes a rod having two ends being an operation end and a joint end, respectively, and a first mark is arranged on the rod. The shielding component is movably sleeved on the rod. The adapter is detachably combined with the rod surgical instrument. The shielding component is located at a first position on the rod to shield the first mark as the surgical tool is in an unused state. As the surgical tool is in a used state, and after the rod surgical instrument is separated from the adapter, the shielding component moves from the first position of the rod to a second position of the rod to expose at least part of the first mark.

In another aspect, the present disclosure provides an identification system for determining usage status of surgical tools. The identification system includes an image capturing module, a processing module and a display module. The image capturing module is configured to capture an image of a surgical tool. The processing module is electrically connected to the image capturing module. The display module is electrically connected to the processing module. The surgical tool includes a rod surgical instrument, a shielding component, and an adapter. The rod surgical instrument includes a rod having two ends being an operation end and a joint end, respectively, and a first mark is arranged on the rod. The shielding component is movably sleeved on the rod. The adapter is detachably combined with the rod surgical instrument. The shielding component is located at a first position on the rod to shield the first mark as the surgical tool is in an unused state. As the surgical tool is in a used state, and after the rod surgical instrument is separated from the adapter, the shielding component moves from the first position of the rod to a second position of the rod to expose at least part of the first mark. The processing module is configured to identify the captured image to determine whether the surgical tool is in the unused state or the used state at least according to an exposed state of the first mark before the surgical tool is used for surgery. The processing module is further configured to correspondingly generate a recognition result message, and display the recognition result message through the display module.

Therefore, in the surgical tool and the identification system for determining usage status of the same, according to exposed or covered states of the first mark and/or the second mark, it can be determined whether the rod surgical instrument or the surgical device containing the rod surgical instrument has been used. In addition, it is necessary to combine the rod surgical instrument with the adapter when using the surgical tool provided by the present disclosure, such that the shielding component can be pushed from the first position to the second position, and the surgical tool, once used, is inevitably converted from the unused state to the used state. The present disclosure provides a mechanism to confirm whether the surgical tool is to be reused. In this way, it is possible to avoid infection in the patient caused by repeated use of the surgical tool, thereby reducing surgery-related risk.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
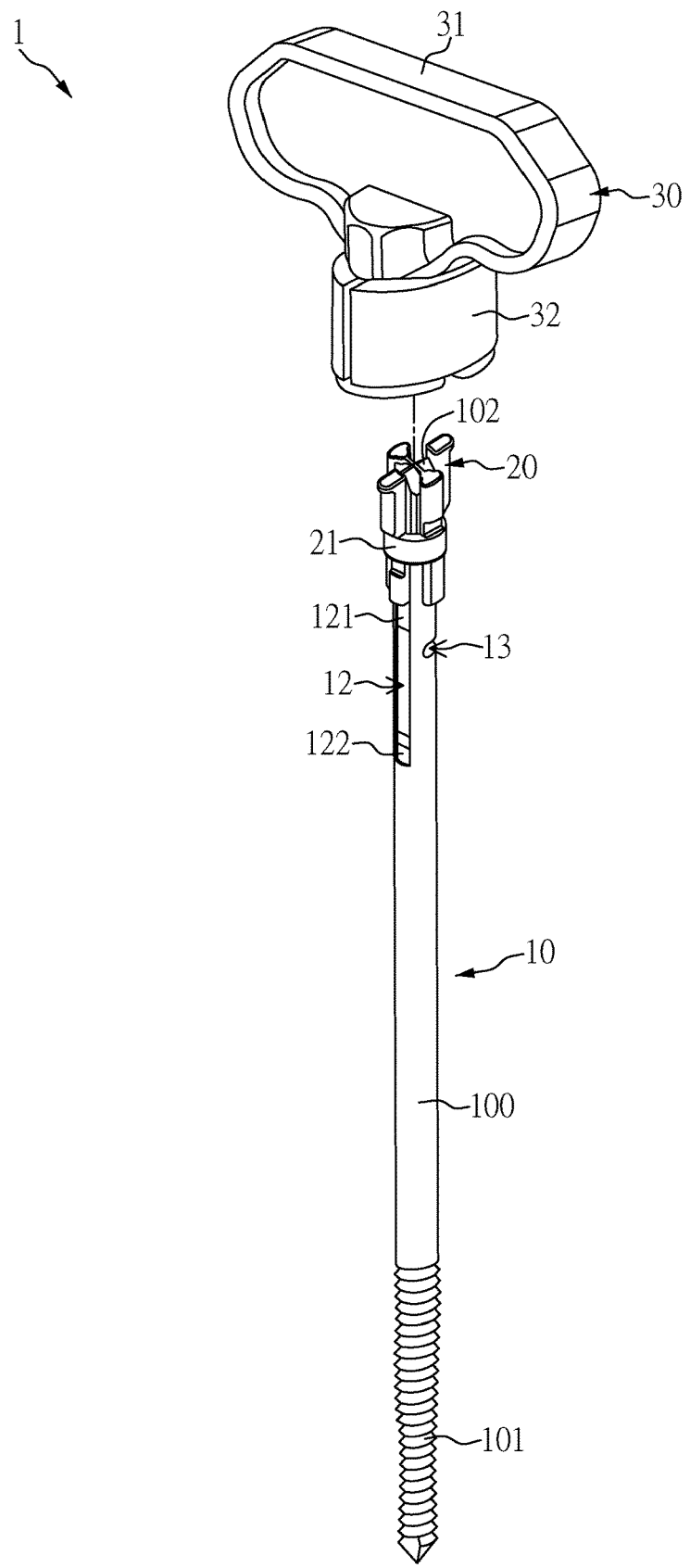
FIG. 1 is a perspective view of a surgical tool in an unused state according to the present disclosure.

As shown in FIGS. 1 to 5, the present disclosure provides a surgical tool 1, which includes a rod surgical instrument 10 and a shielding component 20. The rod surgical instrument 10 can be, for example, a disposable surgical instrument for spinal surgery, such as a Schanz pin, and the rod surgical instrument can include a rod 100. For example, the rod 100 can be made of a medical metal, an operation end 101 of the rod 100 can be provided with a cutting edge and a self-tapping thread, and a joint end 102 of the rod 100 can be provided with a special structure for use in conjunction with a hand piece that matches the special structure.

It should be noted that the used existing surgical tools may be mistakenly used again since there is no effective confirmation mechanism. In a case where the used surgical tools are not sterilized thoroughly or have been frayed due to being used, risk of failure surgery rises. For this reason, the present disclosure provides a first mark 11 on the rod 100. In some embodiments, the first mark 11 can be, for example, a ring-shaped mark disposed on a surface of the rod 100 and surrounding the rod 100. The first mark 11 can be formed by coating a reflective material on the surface of the rod 100, but the present disclosure is not limited thereto. Moreover, the first mark 11 can be disposed close to the joint end 102, that is, a distance between the first mark 11 and the operation end 101 can be greater than a distance between the first mark 11 and the joint end 102.

Figure 3:
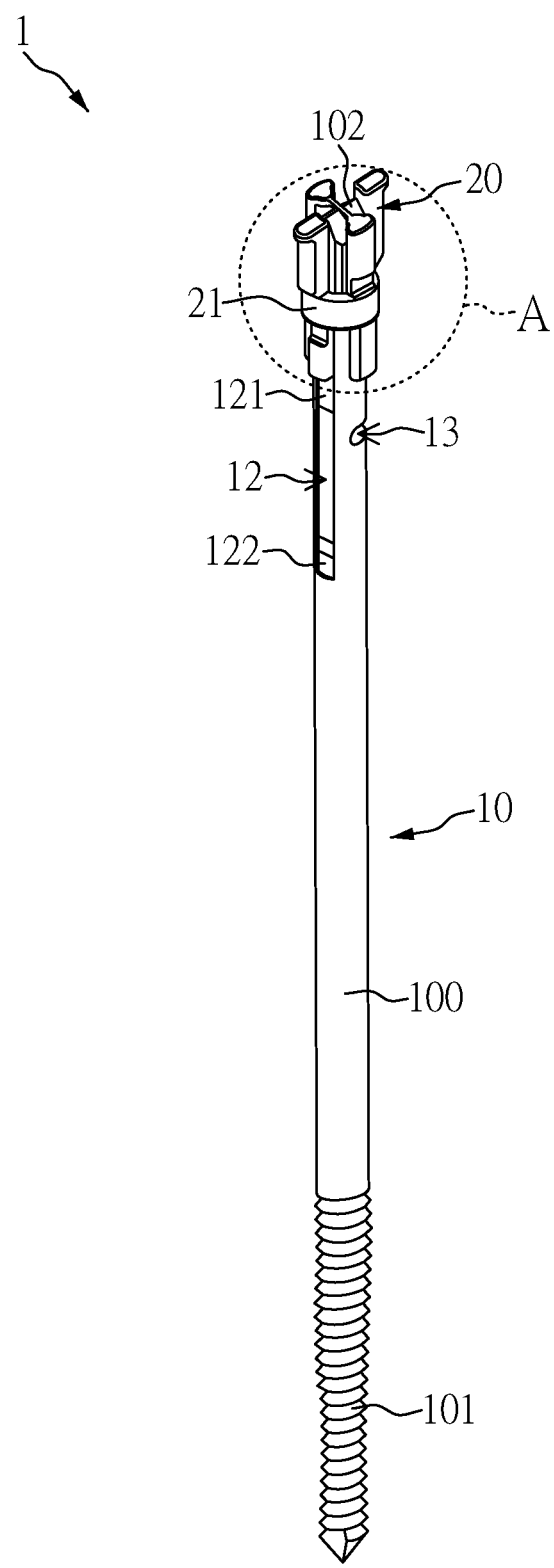
FIG. 3 is a perspective view showing an unused state in which the shielding component of the surgical tool is combined with the rod surgical instrument according to the present disclosure.

Further reference can be made to FIG. 3, the shielding component 20 can be, for example, a plastic sleeve, which is movably disposed on the rod 100. In detail, by disposing the shielding component 20 at different locations on the rod 100 and designing the shielding component 20 to shield the first marker 11 in different ways, the surgical tool 1 of the present disclosure can be changed from an unused state to a used state. For example, reference can be made to a position of the shielding component 20 relative to the rod 100 within FIG. 1 or 3, which shows that the shielding component 20 is located at a first position on the rod 100 and can cover the first mark 11 as the surgical tool 1 is in the unused state, and a state in which the first mark 11 is covered by the shielding component 20 can be defined as the unused state. In some embodiments, any position where the shielding component 20 can completely cover the first mark 11 can be regarded as the first position. Taking FIGS. 3 and 4 as examples, the shielding component 20 is disposed at a position close to the joint end 102 on the rod 100 and completely covers the first mark 11. In addition, the shielding component 20 is further set to be movable from the first position along a first direction, for example, a direction from the joint end 102 toward the operation end 101, but the present disclosure is not limited thereto.

Part of detailed structures of the rod 100 and the shielding component 20 are described below with examples. As shown in FIG. 1, in some embodiments, a fixing groove 12 is formed on the surface of the rod 100. As shown in FIG. 4, the shielding component 20 has a fixing structure 220 corresponding to the fixing groove 12, and the shielding component 20 can be fixed on the first position of the rod 100 through the fixing structure 220 to keep the surgical tool 1 in the unused state. For example, the shielding component 20 can include an annular body 200, which can accommodate at least a part of the rod 100 and allow it to pass there-through. The shielding component 20 has a limiting end 23 and a fixed end 22, and the fixing structure 220 corresponding to the fixing groove 12 can be located at the fixing end 22.

Figure 5:
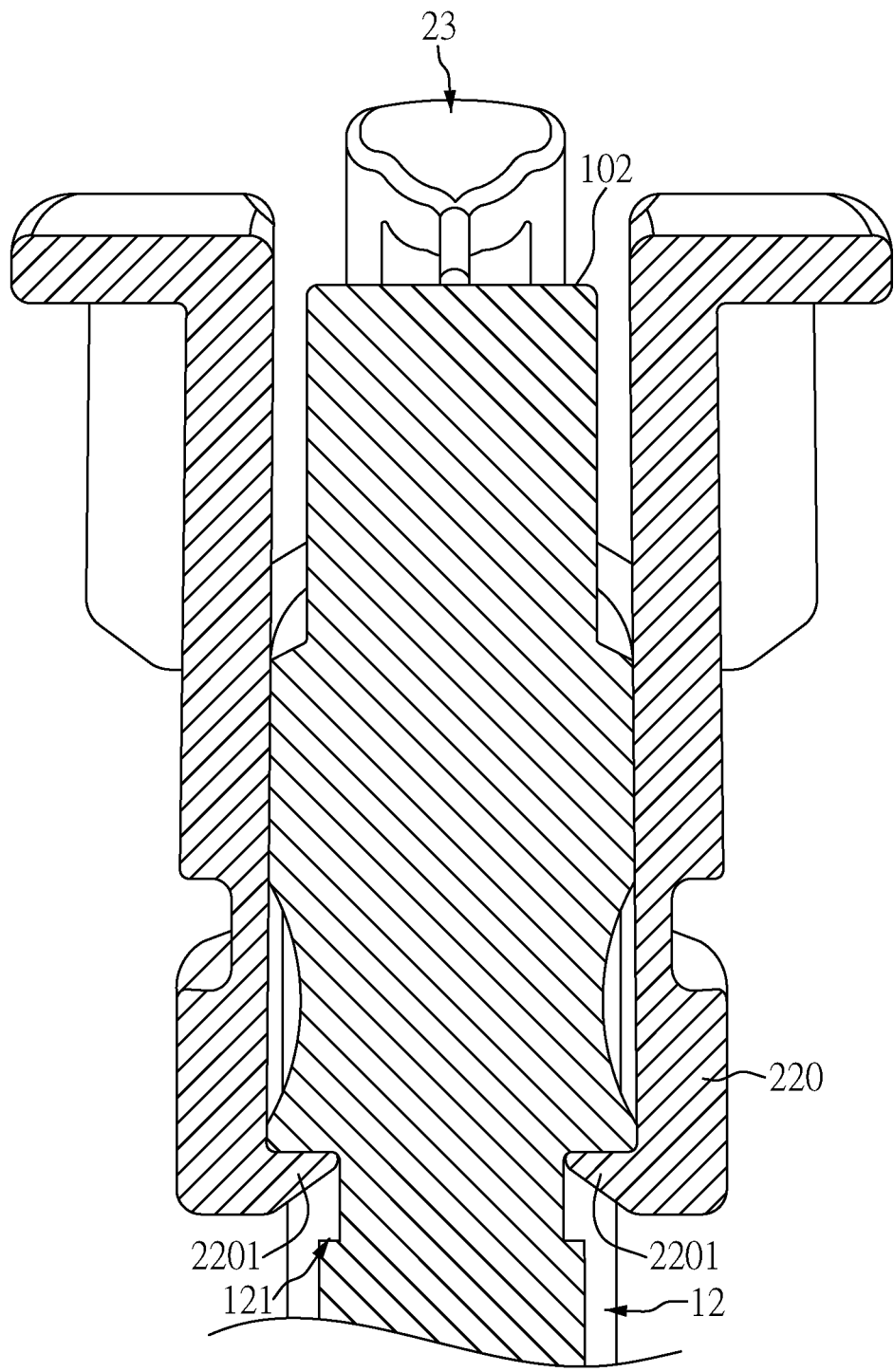
FIG. 5 is a vertical sectional view along line V-V at a junction of the shielding component and the rod surgical instrument in FIG. 4.

As shown in FIG. 5, the fixing structure 220 can include at least one clasp part 2201, and the clasp part 2201 can, for example, have a hook structure for being fixed to the fixing groove 12. In some embodiments, a quantity of the clasp part 2201 can be plural, for example, the quantity is four, but the present disclosure does not limit the quantity of the clasp part 2201.

On the other hand, as shown in FIGS. 3 and 5, a first stop part 121 can be further formed at a location adjacent to the joint end 102 in the fixing groove 12, and the shielding component 20 is located at the first position when the clasp part 2201 is clasped to the first stop part 121 of the fixing groove 12, that is, the surgical tool 1 is in the unused state. For example, the first stop part 121 can be, for example, a protruding structure or a concave structure formed at the location adjacent to the joint end 102 in the fixing groove 12, and is used to stop the clasp part 2201 (such as the hook) at an upper end of the fixing groove 12, that is, at an edge of the fixing groove 12 near the joint end 102. That is, the first stop part 121 can have a stepped structure, which has a predetermined height difference relative to a bottom surface at a center of the fixing groove 12.

In addition to the above structures, the rod 100 and the shielding component 20 have other features corresponding to each other for fixing the shielding component 20 at the first position. Details of another part of the rod 100 and the shielding component 20 are further described below with examples. Reference is made to FIGS. 2 to 5. In some embodiments, the limiting end 23 further has a limiting structure 230. In the unused state, the limiting end 23 is adjacent to the joint end 102 of the rod 100, and the fixing end 22 is farther away from the joint end 102 of the rod 100 than the limiting end 23. More precisely, in the unused state, the limiting structure 230 can abut against the joint end 102 of the rod 100. Furthermore, the limiting structure 230 and the joint end 102 can have corresponding structures for abutting against each other. For example, the joint end 102 of the rod 100 can be provided with a sharp part 1021, and the limiting structure 230 has a limiting member 2301 and at least one locking part 2302 which connects to the limiting member 2301.

Figure 2:
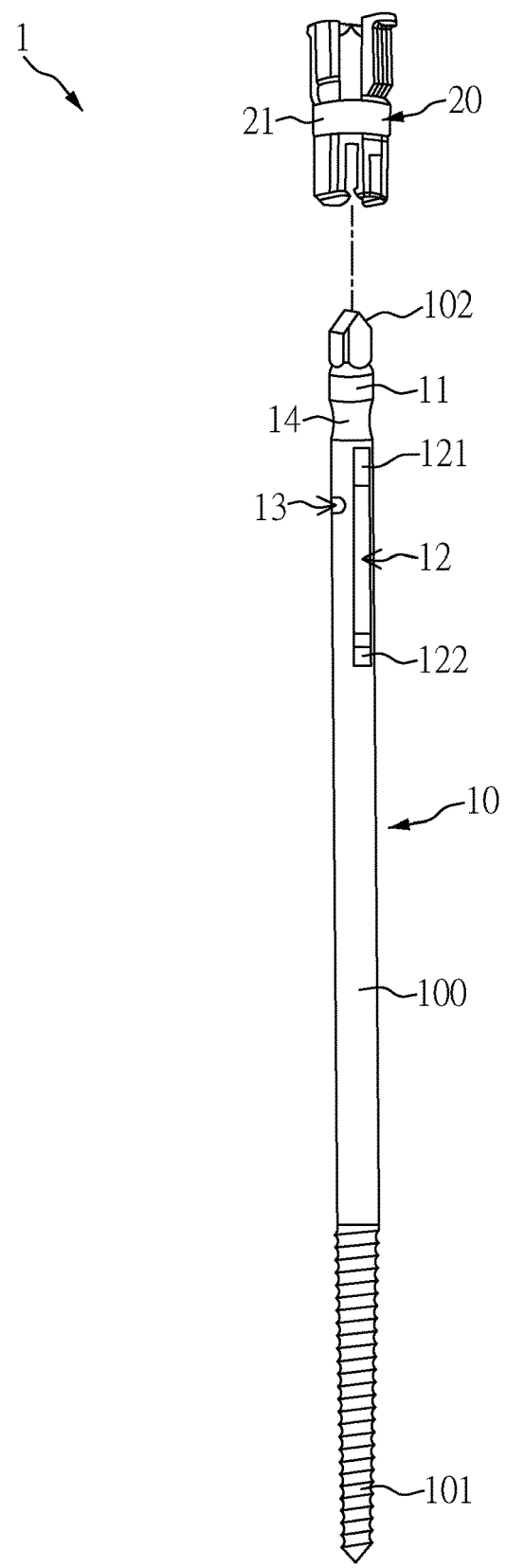
FIG. 2 is a perspective view showing a shielding component of the surgical tool not being combined with a rod surgical instrument according to the present disclosure.
Figure 4:
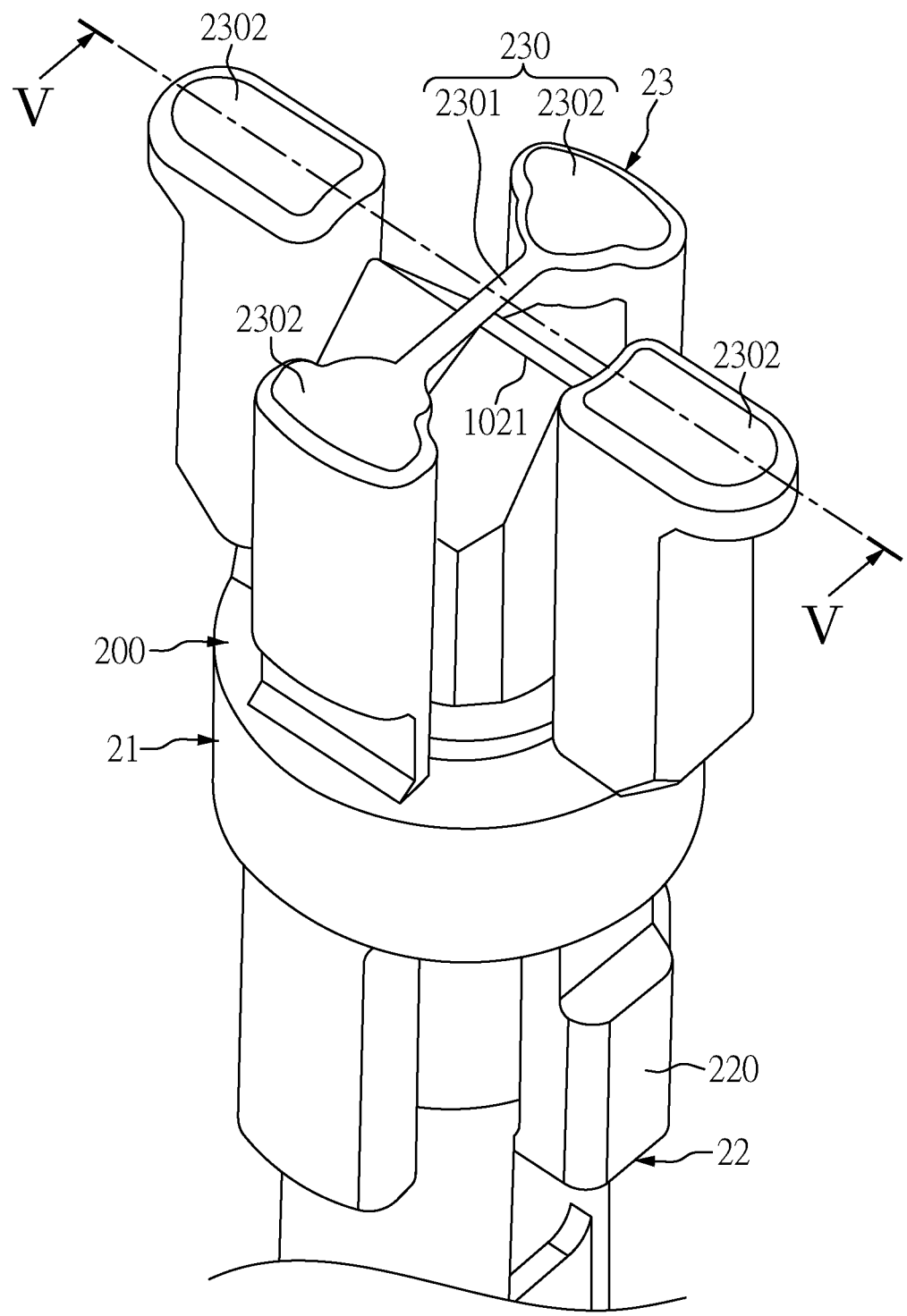
FIG. 4 is an enlarged view of an area A in FIG. 3.

Taking FIG. 4 as an example, the limiting structure 230 can be provided with four locking parts 2302 emanating from top of the annular body 200 and extending along the direction away from the annular body 200. Among the locking parts 2302, two of them are opposite to each other and connect to each other through the limiting member 2301 at upper ends away from the annular body 200. The limiting member 2301 can have a shape corresponding to the joint end 102. For example, when the sharp part 1021 of the joint end 102 is formed by two intersecting slopes that form an acute angle therebetween, the limiting member 2301 can be provided with a shape that engages with the slopes on both sides of the acute angle of the sharp part 1021. Therefore, when the rod 100 and the shielding component 20 are assembled from a separated state (as shown in FIG. 2) to the unused state (as shown in FIG. 3), the limiting member 2301 can engage and abut against the sharp part 1021, such that the shielding component 20 is fixed at the first position.

In the above embodiments, although it has been described that the state in which the first marker 11 is covered by the shielding component 20 can be defined as the unused state, the present disclosure is not limited thereto, and the unused state can also be defined in other ways. For example, a second mark 21 can be further disposed on the shielding component 20. In some embodiments, the second mark 21 can be, for example, a ring-shaped mark arranged on a surface of the annular body 200 and surrounding the annular body 200, and the second mark 21 can be formed by coating a reflective material on the surface of the annular body 200, but the present disclosure is not limited thereto. It should be noted that the second mark 21 can be made of a reflective material different from that of the first mark 11, so as to distinguish the first mark 11 from the second mark 21. In addition, the first mark 11 and the second mark 21 can also be arranged in different patterns for identification. Therefore, in the embodiments with the second mark 21, a state in which only the second mark 21 is exposed can be defined as the unused state, but the present disclosure is not limited thereto. A state in which a part or all of the first mark 11 is covered and the second mark 21 is exposed can be defined as the unused state.

Therefore, by defining the above-mentioned unused state for the surgical tool 1 provided by the present disclosure, the usage state of the rod surgical instrument 10 can be determined. That is, when the surgical tool 1 is not indicated as being in the unused state, it can be determined that the rod surgical instrument 10 has been used. Based on this mechanism, the used state of the surgical tool 1 can be further defined in the present disclosure, thereby providing a safety mechanism that the surgical tool 1 will be certainly converted from the unused state to the used state, and the safety mechanism will be triggered once the surgical tool 1 is used.

Figure 6:
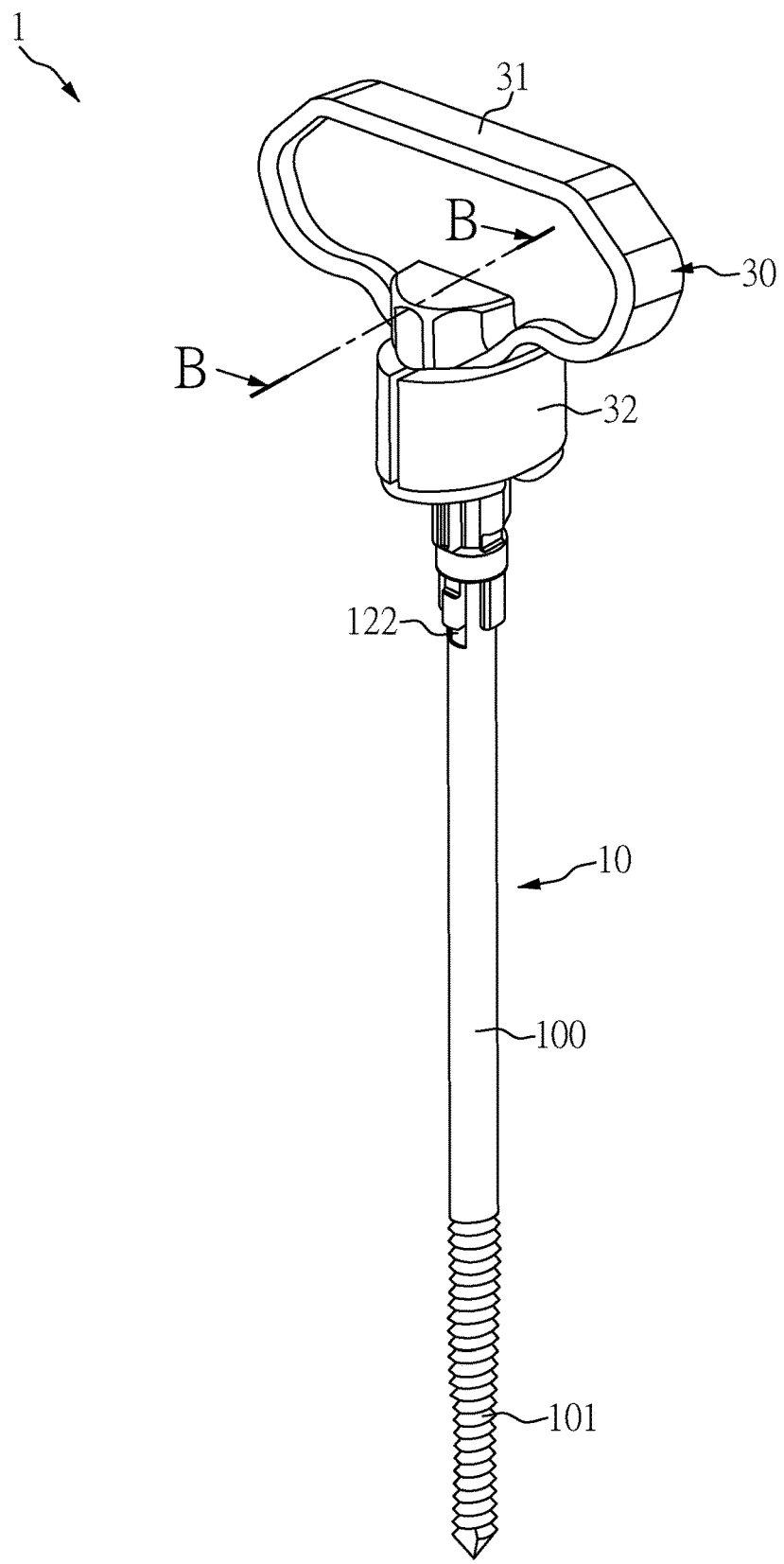
FIG. 6 is a perspective view of the surgical tool in a used state according to the present disclosure.
Figure 7:
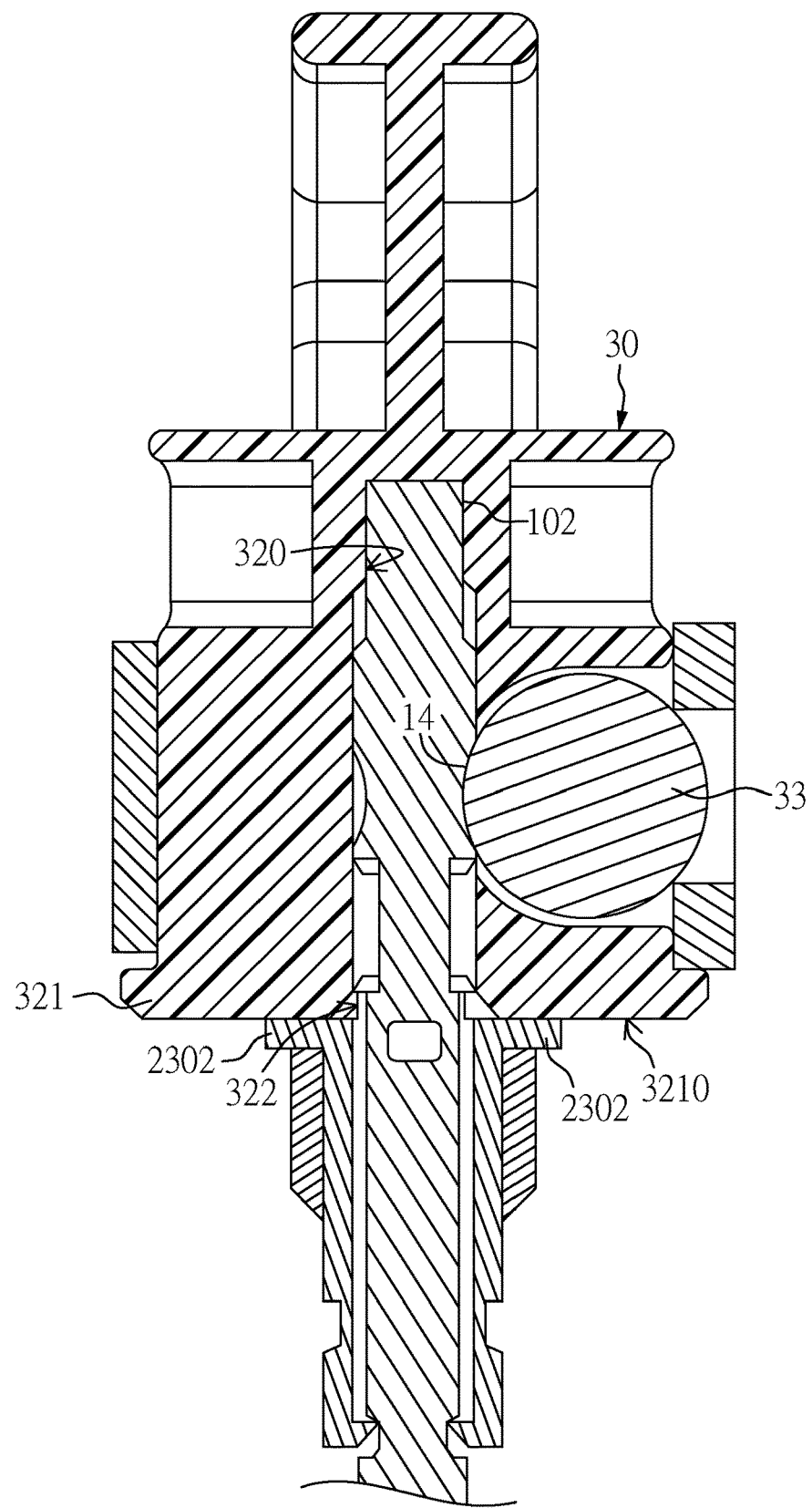
FIG. 7 is a vertical sectional view along line B-B at a junction of an adapter and the rod surgical instrument in FIG. 6.
Figure 8:
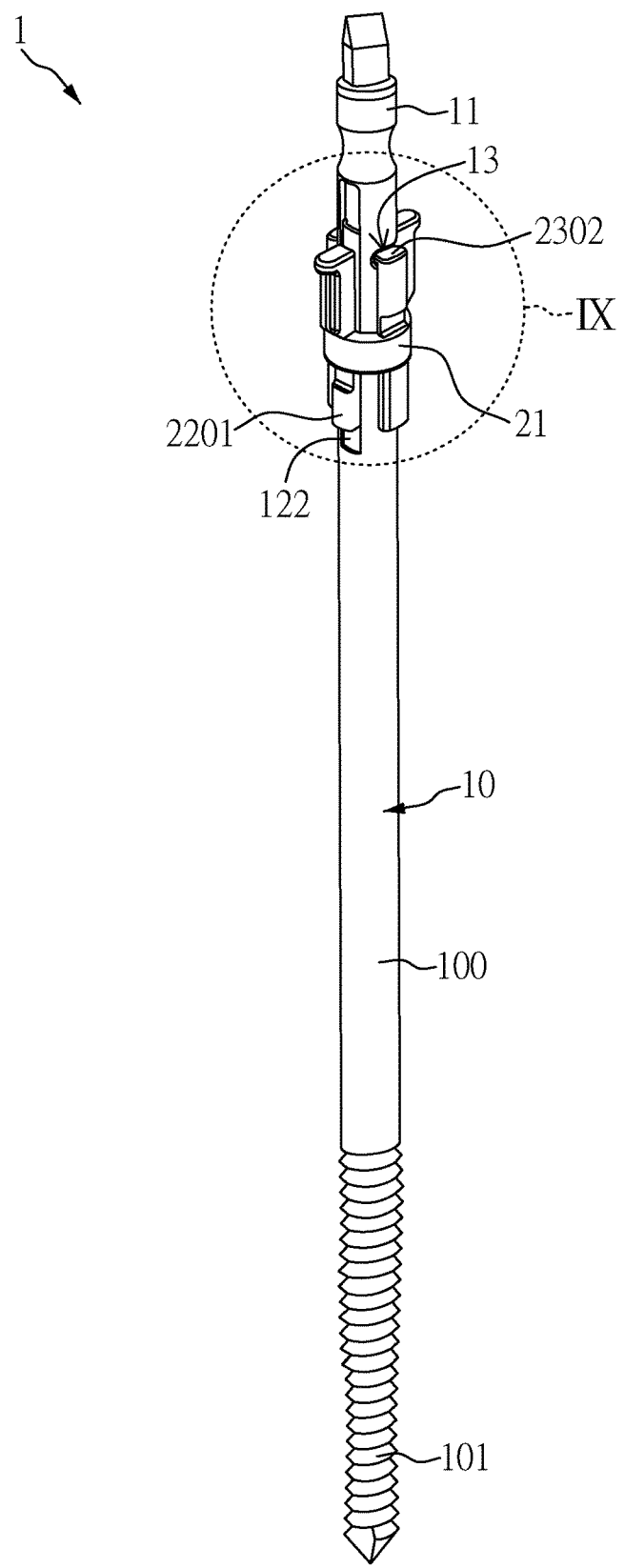
FIG. 8 is a schematic diagram showing a combination of the shielding component and the rod surgical instrument after the surgical tool of the present disclosure is used in surgery.
Figure 9:
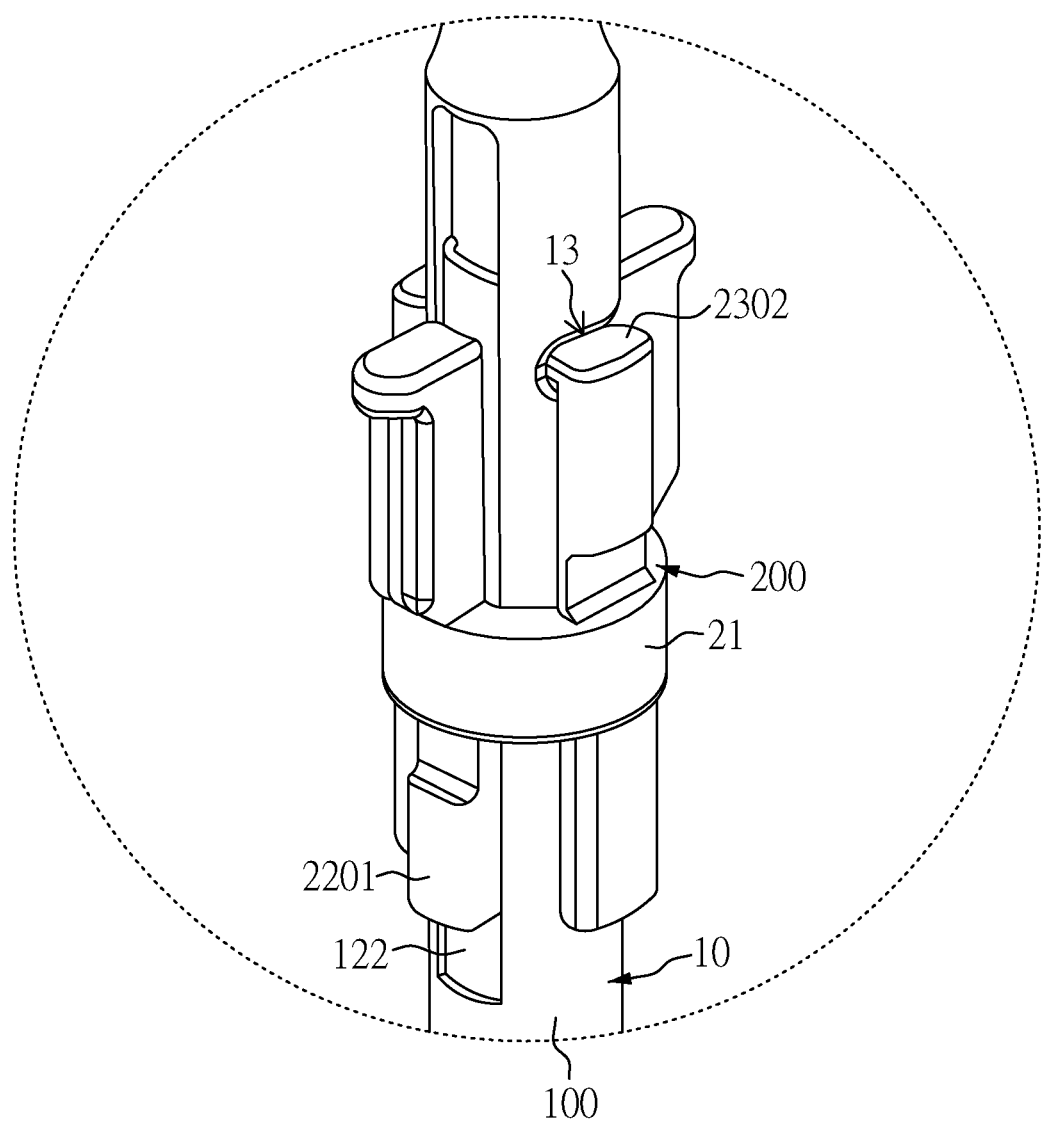
FIG. 9 is an enlarged view of an area IX in FIG. 8.

Reference is made to FIGS. 6 to 9. FIG. 6 is a perspective view of the surgical tool in a used state according to the present disclosure. FIG. 7 is a vertical sectional view along line B-B at a junction of an adapter and the rod surgical instrument in FIG. 6. FIG. 8 is a schematic diagram showing a combination of the shielding component and the rod surgical instrument after the surgical tool of the present disclosure is used in surgery. FIG. 9 is an enlarged view of an area IX in FIG. 8.

As shown in FIGS. 6 to 9, the surgical tool 1 can further include an adapter 30. The adapter 30 can be, for example, a hand tool matching the joint end 102 of the rod 100, such as a handle, but the present disclosure is not limited thereto.

Reference is made to FIG. 6 and FIG. 7, in some embodiments, the adapter 30 can be, for example, a manually turned handle instrument, which has a grip part 31, a joint part 32 and a positioning member 33. The grip part 31 can be connected to the joint part 32 and be made of a hard material. For example, the grip part 31 can be formed with a structure that can be held in a palm of an ordinary adult, such as a ring-shaped handle formed by a strip of hard material. Through the adapter 30, torque can be transferred to the rod surgical instrument 10 (e.g., Schanz pin).

On the other hand, the joint part 32 can include a housing 321 that defines an accommodating space 320 therein. As shown in FIG. 7, the accommodating space 320 can accommodate at least a part of the rod 100, for example, the accommodating space 320 can have a predetermined depth and a predetermined diameter, so as to at least accommodate the joint end 102 and a part with the first mark 11 of the rod 100. In addition, the housing 321 also has an opening 322, which can have a shape corresponding to a cross-section of the joint end 102 of the rod 100, so as to ensure that the adapter 30 can apply torque to the surface of the rod 100 and make the rod surgical instrument 10 to rotate along with the adapter 30. For example, the shape of the cross-section of the joint end 102 can be a polygon, such as a triangle, a rectangle, a pentagon, a hexagon and the like.

In addition, in order to push and move the shielding component 20, the diameter of the opening 322 can be larger than a diameter of the rod 100 but smaller than an inner diameter of the shielding component 20. It should be noted that, the inner diameter of the shielding component 20 can be, for example, the inner diameter of the annular body 200, or an inner diameter at the limiting end 23. Taking FIG. 4 as an example, the inner diameter of the limiting end 23 can be, for example, a distance between two opposite ones of the four locking parts 2302.

Therefore, when a user wants to utilize the rod surgical instrument 10 combining the shielding component 20 to conduct a surgery, the adapter 30 can be detachably combined with the rod surgical instrument 10 through the joint part 32. For example, a surgery operator can hold the grip part 31, align the opening 322 of the joint part 32 with the limiting end 23 of the shielding component 20, and apply an external force on the housing 321 of the joint part 32 to push the shielding component 20 toward the surgical end 101, so as to expose the first mark 11. It should be noted that, in a case that the shielding component 20 is not provided with the second mark 21, a state in which the first mark 11 is partly or fully exposed can be defined as the used state of the rod surgical instrument 10 or the surgical tool 1, and in a case that the shielding component 20 is provided with the second mark 21, a state in which the first mark 11 is partly (or fully) exposed and the second mark 21 is exposed can be defined as the used state of the rod surgical instrument 10 or the surgical tool 1.

In other embodiments, it is feasible, for example, to apply an external force on the housing 321 of the joint part 32 to push against the annular body 200. For the present disclosure, in the embodiments in which multiple locking parts 2302 and multiple limiting members 2301 are used to fix the shielding component 20 at the first position, it is feasible to apply an external force on a surface 3210 of the housing 321 that faces the shielding component 20 to push against the locking parts 2302 of the shielding component 20. Next, the adapter 30 can be used to apply an external force along a direction from the joint end 102 toward the operation end 101, such that the sharp part 1021 that abuts against the limiting member 2301 breaks the limiting structure 230, and the shielding component 20 is pushed from the first position along a direction toward the operation end 101. Therefore, the first mark 11 is no longer covered by the shielding component 20. In some embodiments, the sharp part 1021 may not be provided. In this case, the limiting structure 230 is broken by an external force before the surgical tool 1 is used (that is, before the adapter 30 is combined with the rod surgical instrument 10), such that the shielding component 20 can be moved from the first position along the direction toward the operation end 101.

Therefore, as shown in FIGS. 7 and 8, when the shielding component 20 moves, along the rod 100, toward the operation end 101, the clasp part 2201 of the shielding component 20 moves from the first stop part 121, along the fixing groove 12, toward the operation end 101. Reference is made to FIG. 2, a second stop part 122 can be further formed at a location of the fixing groove 12 distant from the joint end 102. For example, the second stop part 122 can be, for example, a protruding structure or a concave structure formed at the location in the fixing groove 12 distant from the joint end 102, and is used to stop the locking part 2201 (such as the hook) at a lower end of the fixing groove 12, that is, at an edge of the fixing groove 12 away from the joint end 102. In other words, similar to the first stop part 121, the second stop part 122 can have another stepped structure, which has another predetermined height difference relative to a bottom surface at a center of the fixing groove 12.

Therefore, after the clasp part 2201 moves from the first stop part 121 to the second stop part 122, the clasp part 2201 is clasped to the second stop part 122. Meanwhile, although the shielding component 20 is located at the second position, the first mark 11 is covered by the housing 321, that is, the rod surgical instrument 10 or the surgical tool 1 including the same is in the unused state. It should be noted that the second stop part 122 is not limited to being disposed on the edge of the fixing groove 12 away from the joint end 102, and as long as that the shielding component 20 no longer covers the first mark 11, the second stop part 122 can be arranged at any position in the fixing groove 12.

Moreover, a locking groove 13 can be further provided on the rod 100, and correspond to one of the locking parts 2302 in position. When the shielding component 20 is located at the first position, the locking groove 13 is located between the corresponding locking part 2302 and the operation end 101. Therefore, when the shielding component 20 moves from the first position to the second position along the rod 100 toward the operation end 101, one of the locking parts 2302 can be correspondingly engaged with the locking groove 13, as shown in FIG. 9, such that the shielding component 20 can be more firmly fixed at the second position. That is, a distance between the locking groove 13 and the corresponding locking part 2302 is equal to a distance traveled by the locking part 2302 when the shielding component 20 moves from the first position to the second position.

Reference is made to FIG. 7, in some embodiments, a positioning recess 14 is formed on the surface of the rod 100, and the adapter 30 can be provided with a positioning member 33 that corresponds to the positioning recess 14. For example, the positioning member 33 can be disposed in the housing 321 and adjacent to the accommodating space 320. When the shielding component 20 moves from the first position to the second position along the rod 100 and toward the operation end 101, a part of the rod 100 close to the joint end 102 is also inserted into the accommodating space 320. The inserted part of the rod 100 is, for example, the joint end 102 and a part of the rod 100 provided with the first mark 11. The positioning recess 14 can be arranged, for example, at a position between the first mark 11 and the joint end 102 on the rod 100. It should be noted that the positioning member 33 can be, for example, a spherical element movably disposed on one side of the accommodating space 320, and the positioning recess 14 can have a shape corresponding to a part of the spherical element. Therefore, when the shielding component 20 moves to the second position, the rod 100 enters the accommodating space 320, and the positioning member 33 of the adapter 30 abuts against the positioning recess 14, such that the rod surgical instrument 10 is fixed to the adapter 30.

Reference is made to FIGS. 8 and 9, after the surgery operation is completed, the user can separate the adapter 30 from the rod surgical instrument 10. Since the shielding component 20 has been moved from the first position on the rod 100 and fixed at the second position, at least a part or all of the first mark 11 is exposed without being covered by the shielding component 20, such that the rod surgical instrument 10 or the surgical tool 1 including the same can be deemed as being in the used state. Alternatively, in the embodiment that the shielding component 20 is provided with the second mark 21, at least a part of or all the first mark 11 is exposed simultaneously with the second mark 21, such that the rod surgical instrument 10 or the surgical tool 1 including the same can be regarded as in the used state. In this way, through verifying that the first mark 21 is covered in the unused state or exposed in the used state, it can be determined whether the rod surgical instrument 10 or the surgical tool 1 including the same has been used, and it is possible to avoid infection in the patient caused by repeated use of the surgical tool 1, thereby reducing surgery-related risk.

In addition, since it is necessary to combine the rod surgical instrument 10 with the adapter 30 when using the surgical tool 1, the shielding component 20 will be pushed from the first position to the second position; this provides a mechanism in which the surgical tool, once used, is inevitably converted from the unused state to the used state. In addition, through the corresponding positioning structures such as the locking part 2201, the second stop part 122 of the fixing groove 12, the locking groove 13 and the clasp part 2302, the shielding component 20 can be fixed at the second position for ensuring that the used rod surgical instrument 10 or the used surgical tool 1 including the same can be kept in the used state, thereby preventing the used rod surgical instrument 10 or the used surgical tool 1 from being reused.

Figure 10:
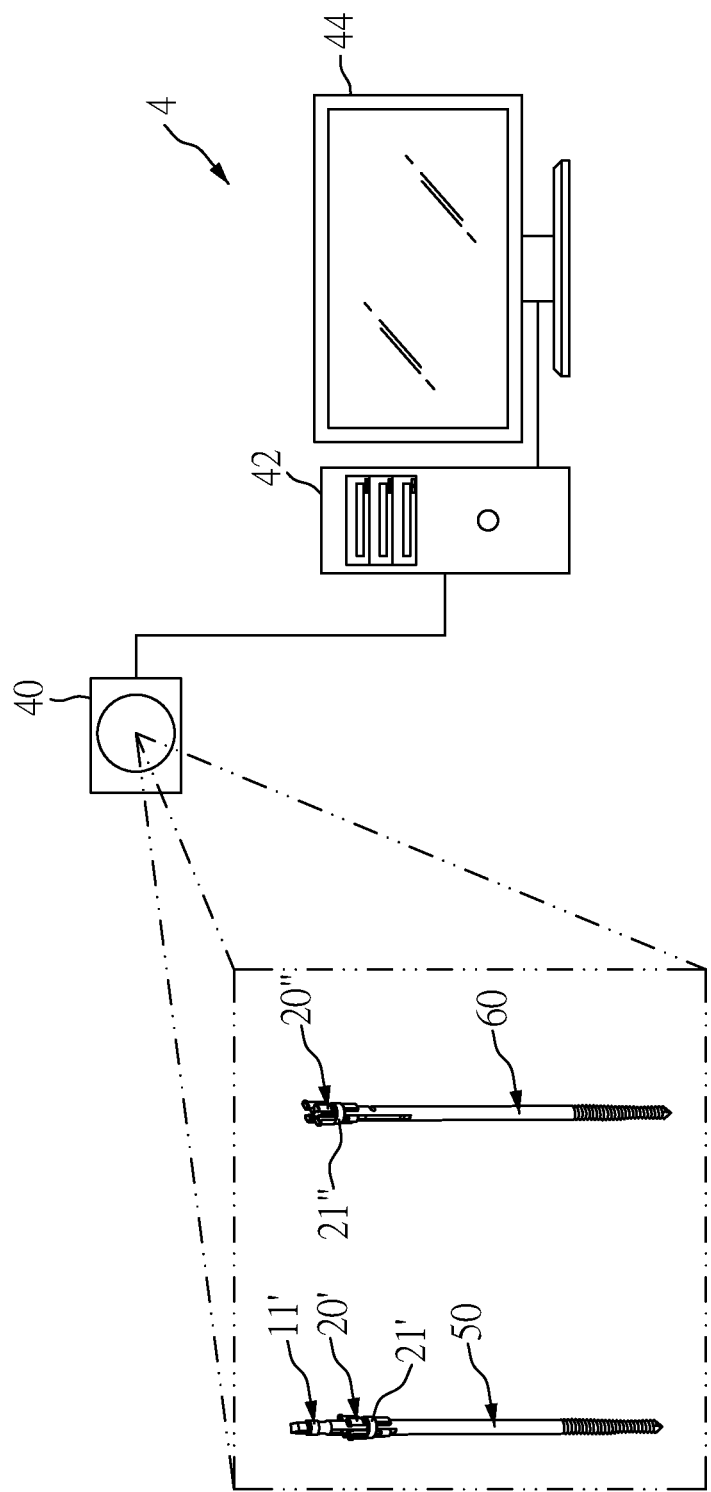
FIG. 10 is a schematic diagram of an identification system for determining usage status of the surgical tool according to the present disclosure.

In order to facilitate determination of the surgical tool before and after being used, other than that the operator visually determines whether or not the first mark is exposed, the present disclosure also provides an identification system for determining the usage state of the surgical tool. Reference is made to FIG. 10, which is a schematic diagram of an identification system for determining usage status of the surgical tool according to the present disclosure. As shown in FIG. 10, an identification system 4 includes an image capture module 40, a processing module 42, and a display module 44. The processing module 42 can be, for example, a computing device including a processor and a memory, such as a computer, a tablet, a notebook, a smartphone, and the like. The image capturing module 40 can be, for example, a camera, which is configured to capture images of surgical tools (or rod surgical instruments 50, 60 as shown in FIG. 10). The display module 44 can be, for example, a display such as a plasma display, a liquid crystal display (LCD), a thin film transistor liquid crystal display (TFT-LCD), an organic light emitting diode (OLED) display, or a light emitting diode (LED) display.

It should be noted that the user can predefine an unused state and a used state of a surgical tool (or the rod surgical instruments 50, 60), respectively. For example, as described above, the state where the first mark 11 is covered by the shielding component 20, the state where only the second mark 21 is exposed, or the state where a part of or all the first mark 11 is covered and the second mark 21 is exposed, can be defined as the unused state. In addition, the state where a part of or all of the first mark 11 is exposed, and the state where the first mark 11 is partially or completely exposed and the second mark 21 is also exposed, can be defined as the used state.

Therefore, the processing module 42 can identify the captured images of the surgical tools to determine whether or the surgical tools are in the unused state or the used state at least according to the exposed states of the first marks. For example, as shown in FIG. 10, the shielding component 20' on the rod surgical instrument 50 is at the second position, such that the first mark 11' and the second mark 21' are exposed; therefore, the processing module 42 can determine that the rod surgical instrument 50 or the surgical tool including the same is in the used state in response to a recognition result indicating that the first mark 11' and the second mark 21' are recognized at the same time in the images. The processing module 42 generates a recognition result message, and correspondingly displays it on the display module 44. The recognition result message can include information indicating that the rod surgical instrument 50 is in the used state.

On the other hand, the shielding component 20" on the rod surgical instrument 60 is at the first position, such that the first mark is covered and only the second mark 21" is exposed. Therefore, the processing module 42 determines that that the rod surgical instrument 60 or the surgical tool including the same is in the unused state in response to the recognition result indicating that the first mark is covered, or only the second mark 21" is identified. The processing module 42 generates a recognition result message, and corresponds to the display mode. The processing module 42 generates a recognition result message, and correspondingly displays it on the display module 44. The recognition result message can include information indicating that the rod surgical instrument 60 is in the unused state.

BENEFICIAL EFFECTS OF THE EMBODIMENTS

In conclusion, in the surgical tool and the identification system for determining usage status of the same, it can be determined whether the rod surgical instrument or the surgical instrument including the rod surgical instrument has been used, according to exposed and covered states of the first mark and/or the second mark. In addition, when using the surgical tool provided by the present disclosure, it is necessary to combine the rod surgical instrument with the adapter, such that the shielding component is able to be pushed from the first position to the second position, and the surgical tool, once being used, is inevitably converted from the unused state to the used state. The present disclosure provides a mechanism to confirm whether the surgical tool is to be reused. In this way, it is possible to avoid infection in the patient caused by repeated use of the surgical tool, thereby reducing surgery-related risk.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A surgical tool, comprising:
    a rod surgical instrument includes a rod having two ends being an operation end and a joint end, respectively, wherein a first mark is arranged on the rod;
    a shielding component movably sleeved on the rod; and
    an adapter detachably combined with the rod surgical instrument;
    wherein, as the surgical tool is in an unused state, the shielding component is located at a first position on the rod to shield the first mark;
    wherein, as the surgical tool is in a used state, and after the rod surgical instrument is separated from the adapter, the shielding component moves from the first position of the rod to a second position of the rod to expose at least part of the first mark.

2. The surgical tool according to claim 1, wherein the shielding component is further provided with a second mark, and when the shielding component is at the second position, the at least part of the first mark and the second mark are exposed simultaneously.

3. The surgical tool according to claim 1, wherein a fixing groove is formed on a surface of the rod, the shielding component has a fixing structure corresponding to the fixing groove and is fixed to the rod through the fixing structure.

4. The surgical tool according to claim 3, wherein the shielding component has a limiting end adjacent to the joint end and a fixed end distant from the joint end as the surgical tool is in the unused state, and the fixing structure is located at the fixed end; and
    wherein the shielding component further has a limiting structure arranged at the limiting end, the limiting structure includes a limiting member and at least one locking part, the at least one locking part is connected to the limiting member, and the limiting structure abuts against the joint end of the rod as the surgical tool is in the unused state.

5. The surgical tool according to claim 4, wherein the shielding component is allowed to move from the first position to the second position along the rod after breaking of the limiting structure.

6. The surgical tool according to claim 5, wherein at least one locking groove is formed on the surface of the rod, and when the shielding component moves from the first position to the second position along the rod, the at least one locking part is correspondingly engaged with the at least one locking groove.

7. The surgical tool according to claim 6, wherein the adapter has a grip part and a joint part, the grip part is connected to the joint part that is used to detachably combine the adapter with the rod surgical instrument, and when the rod surgical instrument is combined with the joint part, the joint end of the rod is inserted into an accommodating space inside the joint part.

8. The surgical tool according to claim 7, wherein the joint part of the adapter includes a housing for defining the accommodating space, the adapter has a positioning member disposed in the housing and adjacent to the accommodating space, a positioning recess is formed on the surface of the rod, and when the rod surgical instrument is combined with the joint part and the rod enters the accommodating space, the positioning member abuts against the positioning recess.

9. The surgical tool according to claim 3, wherein a first stop part is formed at a location, adjacent to the joint end, within the fixing groove, the fixing structure includes a clasp part, and the shielding component is located at the first position when the clasp part is clasped to the first stop part of the fixing groove.

10. The surgical tool according to claim 3, wherein a second stop part is formed at a location, distant from the joint end, within the fixing groove, and the shielding component is located at the second position when the clasp part is clasped to the second stop part.

11. The surgical tool according to claim 5, wherein the joint end of the rod is formed with a sharp part for breaking the limiting structure.

12. An identification system for determining usage status of a surgical tool, the identification system comprising:
   an image capturing module configured to capture an image of the surgical tool;
   a processing module electrically connected to the image capturing module; and
   a display module electrically connected to the processing module;
   wherein the surgical tool includes:
   a rod surgical instrument for one-time use including a rod, wherein the rod has two ends being an operation end and a joint end, respectively, and a first mark is disposed on the rod;
   a shielding component movably sleeved on the rod; and
   an adapter detachably combined with the rod surgical instrument;
   wherein, as the surgical tool is in an unused state, the shielding component is located at a first position on the rod to shield the first mark;
   wherein, as the surgical tool is in a used state, and after the rod surgical instrument is separated from the adapter, the shielding component moves from the first position of the rod to a second position of the rod to expose at least part of the first mark;
   wherein the processing module is configured to identify the captured image to determine whether the surgical tool is in the unused state or the used state at least according to an exposed state of the first mark before the surgical tool is used for surgery, and the processing module is further configured to correspondingly generate a recognition result message, and display the recognition result message through the display module.

13. The identification system according to claim 12, wherein the shielding component is further provided with a second mark, the at least part of the first mark and the second mark are exposed simultaneously when the shielding component is at the second position, and the processing module is further configured to:
   determine that the surgical tool is in the unused state in response to only recognizing the second marker; and
   determine that the surgical tool is in the used state in response to simultaneously recognizing the at least portion of the first mark and the second mark.

14. The identification system according to claim 12, wherein a fixing groove is formed on the surface of the rod, the shielding component has a fixing structure corresponding to the fixing groove and is fixed to the rod through the fixing structure.

15. The identification system according to claim 14, wherein the shielding component has a limiting end adjacent to the joint end and a fixed end distant from the joint end as the surgical tool is in the unused state, and the fixing structure is located at the fixed end; and
   wherein the shielding component further has a limiting structure arranged at the limiting end, the limiting structure includes a limiting member and at least one locking part, the at least one locking part is connected to the limiting member, and the limiting structure abuts against the joint end of the rod as the surgical tool is in the unused state.

16. The identification system according to claim 15, wherein the shielding component is allowed to move from the first position to the second position along the rod after breaking of the limiting structure.

17. The identification system according to claim 16, wherein at least one locking groove is formed on the surface of the rod, and when the shielding component moves from the first position to the second position along the rod toward the operating end, the at least one locking part is correspondingly engaged with the at least one locking groove.

18. The identification system according to claim 17, wherein the adapter has a grip part and a joint part, the grip part is connected to the joint part that is used to detachably combine the adapter with the rod surgical instrument, and when the rod surgical instrument is combined with the joint part, the joint end of the rod is inserted into an accommodating space inside the joint part.

19. The identification system according to claim 18, wherein the joint part of the adapter includes a housing for defining the accommodating space, the adapter has a positioning member disposed in the housing and adjacent to the accommodating space, a positioning recess is formed on the surface of the rod, and when the rod surgical instrument is combined with the joint part and the rod enters the accommodating space, the positioning member abuts against the positioning recess.

20. The identification system according to claim 16, wherein the joint end of the rod is formed with a sharp part for breaking the limiting structure.

* * * * *